United States Patent [19]

Yoshio et al.

[11] Patent Number: 4,989,097

[45] Date of Patent: Jan. 29, 1991

[54] APPARATUS FOR REPRODUCING AND PROCESSING PICTURE INFORMATION FROM A RECORDING MEDIUM

[75] Inventors: Junichi Yoshio; Masami Suzuki, both of Tokorozawa, Japan

[73] Assignee: Pioneer Electronic Corporation, Japan

[21] Appl. No.: 250,066

[22] Filed: Sep. 28, 1988

[30] Foreign Application Priority Data

Apr. 4, 1988 [JP] Japan .................................. 63-82619

[51] Int. Cl.$^5$ .............................................. H04N 5/93
[52] U.S. Cl. ..................................................... 358/335
[58] Field of Search ............... 358/335, 341, 342, 343; 360/19.1, 33.1, 32; 369/32148, 49, 50; 364/521

[56] References Cited

U.S. PATENT DOCUMENTS

| | | | |
|---|---|---|---|
| 4,305,131 | 12/1981 | Best | 364/521 |
| 4,446,488 | 5/1984 | Suzuki | 358/342 |
| 4,490,810 | 12/1984 | Hon | 358/342 |
| 4,630,231 | 12/1986 | Hirata et al. | 358/342 |
| 4,672,473 | 6/1987 | Sugiyama | 358/342 |
| 4,692,816 | 9/1987 | Sugiyama et al. | 358/343 |
| 4,852,073 | 7/1989 | Shinohara et al. | 369/32 |

Primary Examiner—Donald McElheny, Jr.
Attorney, Agent, or Firm—Wegner, Cantor, Mueller & Player

[57] ABSTRACT

An apparatus for reproducing and processing picture information for forming a picture signal corresponding to a subcode obtained from a recording medium on which, in addition to a coded information signal, graphic codes including picture information occuying N (N being a natural number equal to or greater than 2) channels and a recording medium code for specifying the recording medium are recorded, the graphic codes and the recording medium code being inserted as the subcode of the coded information signal. The apparatus is provided with a program memory, an instruction generating device for generating an instruction for designating a channel to be selected out of the N channels by a manual operation during playing of the recording medium, a designated channel data generating device for outputting, in response to a program-play command, a designated channel data indicating a channel designated by the instruction stored in the program memory so that the picture signal is generated from a graphic code occupying a channel of the N channels designated by the designated channel data.

3 Claims, 15 Drawing Sheets

Fig. 10

| TCB | MODE | SUBCODE PICTURE | MOTION PICTURE |
|---|---|---|---|
| 0 0 | TRANSPARENT MODE | 0 % | 100 % |
| 1 0 | MIXING MODE | M % | (100-M) % |
| 1 1 | NON-TRANSPARENT MODE | 100 % | 0 % |

Fig. 5

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | | | PARITY Q | | | |
| 3 | | | | | | |
| 4 | | | COLOR 0 | | | |
| 5 | | | | | | |
| 6 | | | ⋮ | | | |
| 17 | | | | | | |
| 18 | | | COLOR 7 | | | |
| 19 | | | | | | |
| 20 | | | PARITY P | | | |
| ⋮ | | | | | | |
| 23 | | | | | | |

Fig. 4

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | | | PARITY Q | | | |
| 3 | | | | | | |
| 4 | CHANNEL | | COLOR 0 | | | |
| 5 | CHANNEL | | COLOR 1 | | | |
| 6 | 0 | | ROW | | | |
| 7 | | | COLUMN | | | |
| 8 | | | FONT | | | |
| ⋮ | | | | | | |
| 19 | | | | | | |
| 20 | | | PARITY P | | | |
| ⋮ | | | | | | |
| 23 | | | | | | |

Fig. 8

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 9

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | | | | | | |
| 23 | | | | | | |

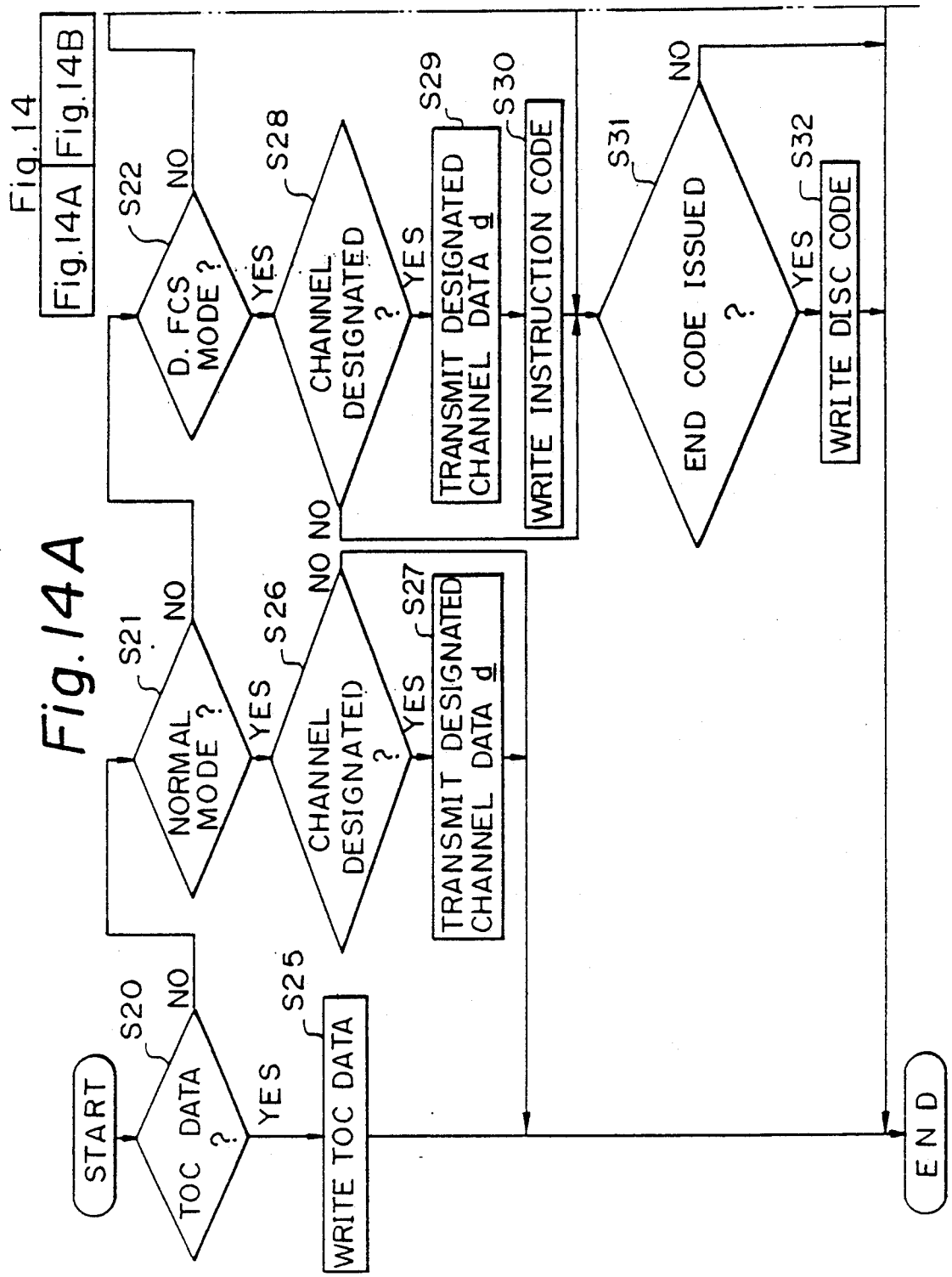

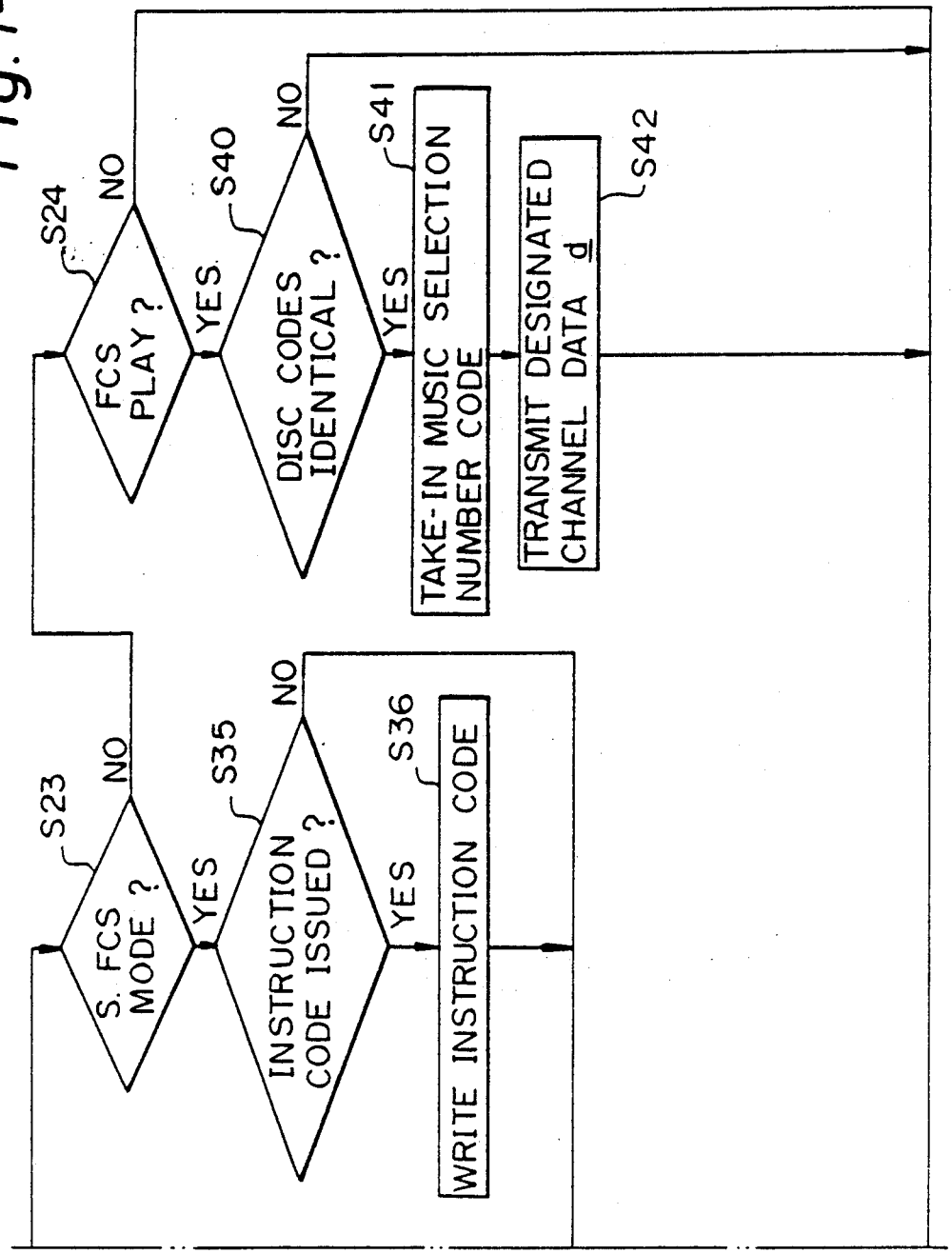

APPARATUS FOR REPRODUCING AND PROCESSING PICTURE INFORMATION FROM A RECORDING MEDIUM

BACKGROUND OF THE INVENTION

1. Field of the Invention

The present invention relates to a picture information reproducing and processing apparatus for forming a picture signal from picture information recorded, as the subcode of a coded information signal such as a digital audio signal, on a recording medium such as a video disc, a digital audio disc, and so on.

2. Description of Background Information

A system is proposed in which picture information is recorded and reproduced in the form of the subcode on and from a digital audio disc having a diameter of approximately 12cm which is generally designated as compact disc (referred to as the CD hereinafter). The subcode is made up of eight subcode bits, and bit groups forming the subcode are divided into eight channels denoted respectively by letters P, Q, R, S, T, U, V, and W. In the system in which the picture information is recorded and reproduced in the form of subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms "instruction" which indicates the sort of instruction. Symbols 2 and 3 following the symbol 1 constitute a parity Q which is an error correction code. Symbols 4 through 19following the parity Q constitute a data field, and include information such as color information. Finally, symbols 20 through 23 following the data field constitute a parity p Which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area being long sideways is formed by pixels which are arranged in 288 columns and 24 rows. In other words, each row includes 288 pixels and each column includes 24 pixels. The term "pixel" stands for the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the Screen area, to form a picture area having 50 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P form data including information relating to a pause between two music selections.

This system for recording and reproducing picture information as the subcode is designed so that sixteen picture channels can be designated respectively at maximum. Specifically, a "write font foreground/background" instruction, used in the "TV-graphics mode" for example, has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and on the playing side, a desired picture channel can be selected at the time of playing by this scheme of designating the picture channel.

In addition, there are numbers from "0" to "15" as the color number. Different sixteen colors are respectively corresponding to these color numbers from "0" to "15", and the sixteen colors indicated by the color number "0" through "15" are set by a "load CLUT color 0 through color 15 (load color look-up table color 0 through color 15)" instruction in the "TV-graphics mode". The "load CLUT color 0 through color 15"

instruction is an instruction having a structure illustrated in FIG. 5, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4(=16)$ sorts of gray scales are available for each color, and preparation of $16^3(=4096)$ colors is possible since three colors (RGB) are used. In addition, a gray scale "0000" corresponds to the darkest state, and a gray scale "1111" corresponds to the brightest state.

In conventional picture information reproducing and processing apparatuses for reproducing picture information recorded on a recording medium by the above described system of recording and reproducing picture information as the subcode, the construction of the apparatus is such that only picture information of a channel designated by a manual operation out of picture information obtained from the recording medium is selectively taken-in and a picture signal such as a video format signal of the NTSC system is formed by means of the taken picture information. Therefore, with conventional picture information reproducing and processing apparatuses, if it is desired for example, during the playing of a recording disc on which picture information corresponding to a plurality of pictures showing words in a plurality of languages different from each other is recorded in the picture channels respectively, to see the words in a different language for the playing of each music selection, then a manual operation is required every time the music selection changes. Thus, there have been a problem that the operation of conventional apparatus is troublesome in some occasions.

OBJECT AND SUMMARY OF THE INVENTION

The present invention is based on the point described above, and an object of the present invention is therefore to provide a picture information reproducing and processing apparatus which is quite easy to operate.

According to the present invention, a picture information reproducing and processing apparatus comprises a program memory, a separating means for separating from the subcode a recording medium code for specifying the recording medium, and an instruction generating means for generating, by a manual operation, an instruction for designating a channel out of N channels which is to be selected during the playing of the recording medium, and is configured to write this instruction and the recording medium code outputted from the separating means at the time of the generation of that instruction, in the program memory, to generate, in response to a program play command, a designated channel data indicating a channel designated by the instruction written in the program memory when the recording medium code written in the program memory and the recording medium code outputted from the separating means, and to form a picture signal corresponding to a graphic code occupying the channel indicated by the channel data.

BRIEF DESCRIPTION OF THE DRAWINGS

FIG. 4 is a diagram showing the construction of "write font foreground/background" instruction;

FIG. 5 is a diagram showing "load color look-up table color 0 through color 7" instruction;

FIG. 6 is a diagram showing the arrangement of FIGS. 6A through 6C;

FIG. 8 is a diagram showing the sort of recording modes in the case of recording a picture on a composite disc;

FIG. 9 is a diagram showing the construction of "load transparency control table";

FIG. 10 is a diagram showing the correspondency between the bit pattern of TCB and the mixing ratio;

FIG. 14A and 14B are flowcharts showing the operation of processor in a designated channel data generating circuit 91 of the apparatus shown in FIGS. 6A through 6C;

DETAILED DESCRIPTION OF PREFERRED EMBODIMENTS

An embodiment of the method according to the present invention will be explained with reference to FIGS. 6A–6C through 16 of the accompanying drawings.

Figure 1:
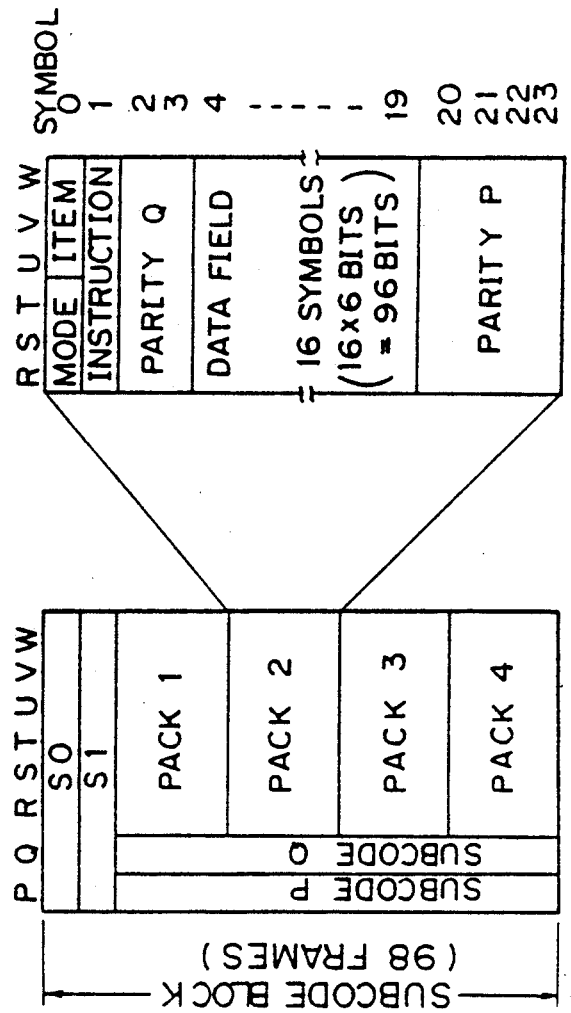
FIG. 1 is a diagram showing the recording format of the subcode.
Figure 2:
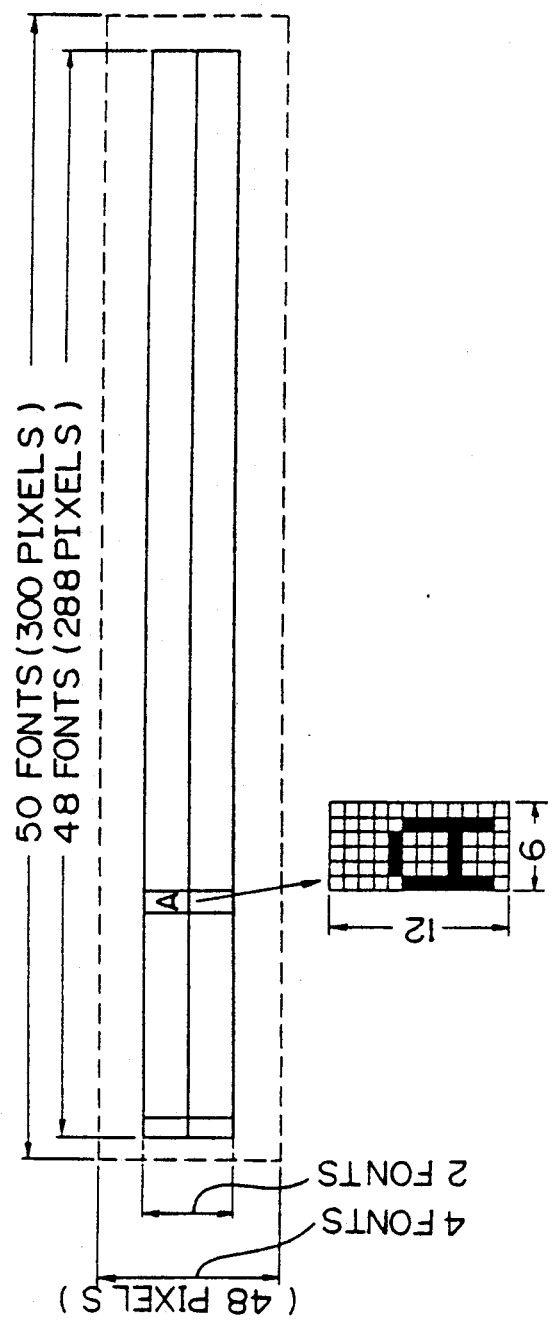
FIG. 2 is a diagram shoWing the structure of picture in the "line-graphics mode"
Figure 3:
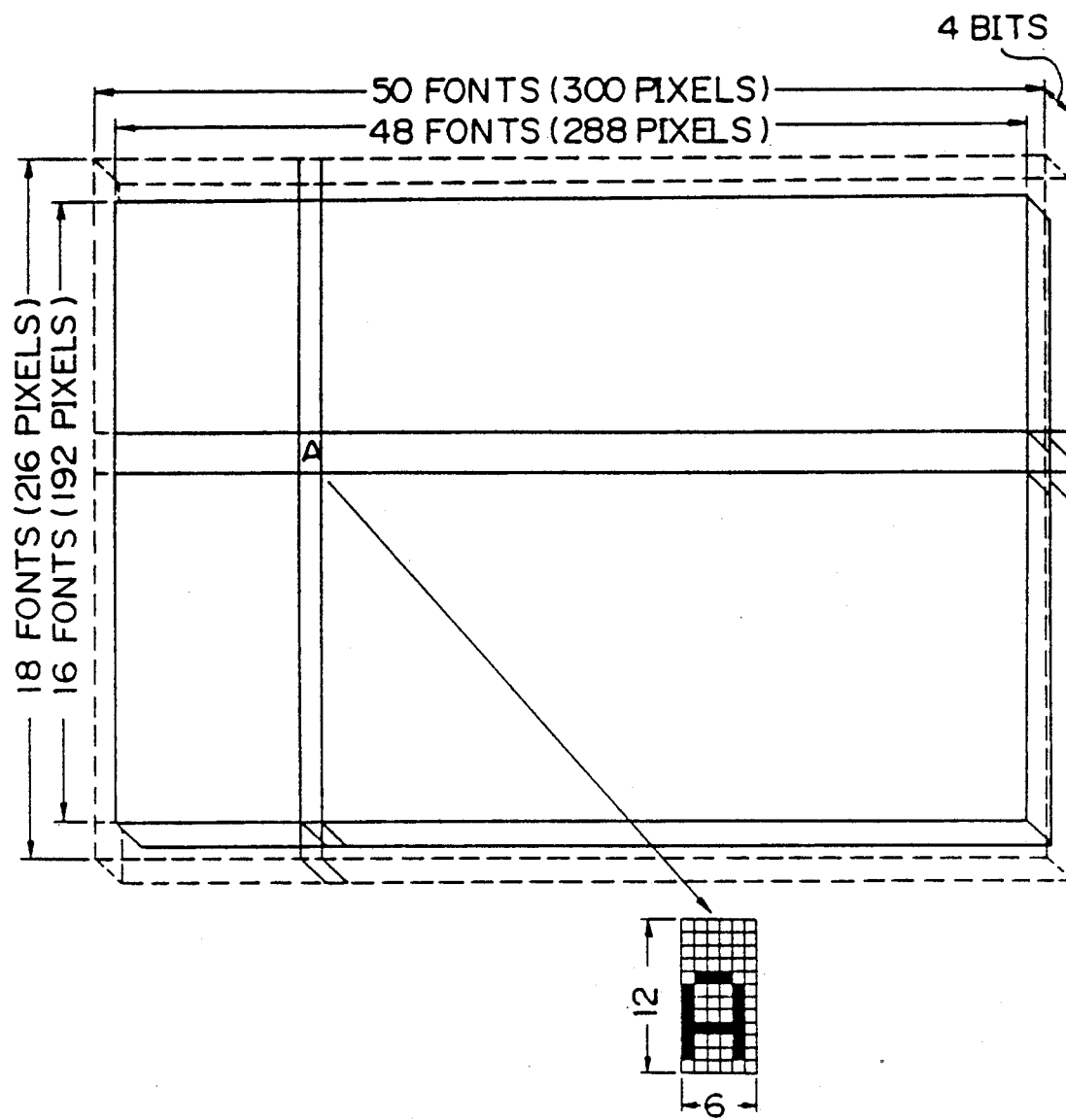
FIG. 3 is a diagram showing the structure of picture in the "TV-graphics mode"
Figure 6A:
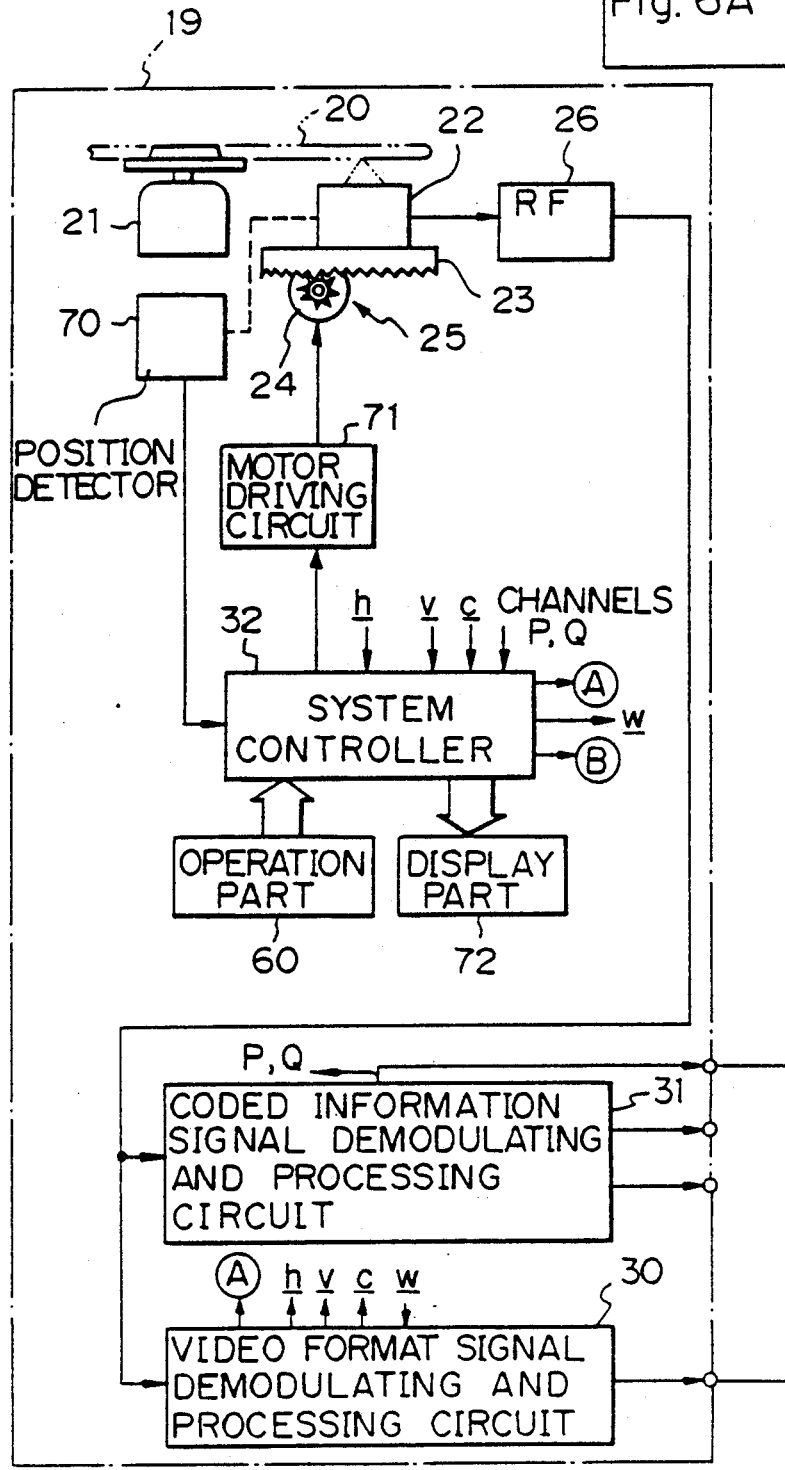
FIGS. 6A through 6C, when combined, are a block diagram showing an embodiment of a picture information reproducing and processing apparatus according to the present invention.
Figure 6B:
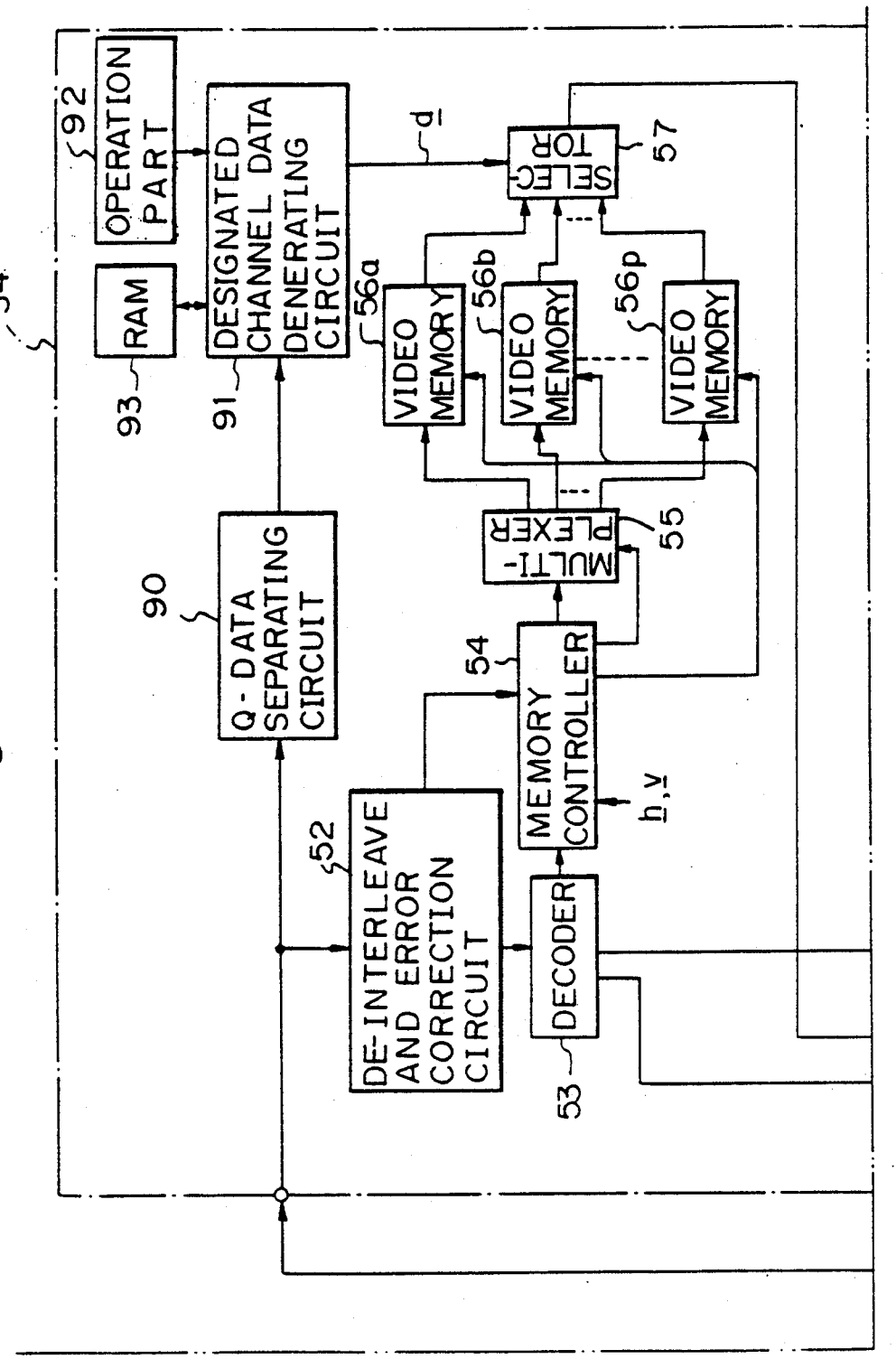
Figure 6C:
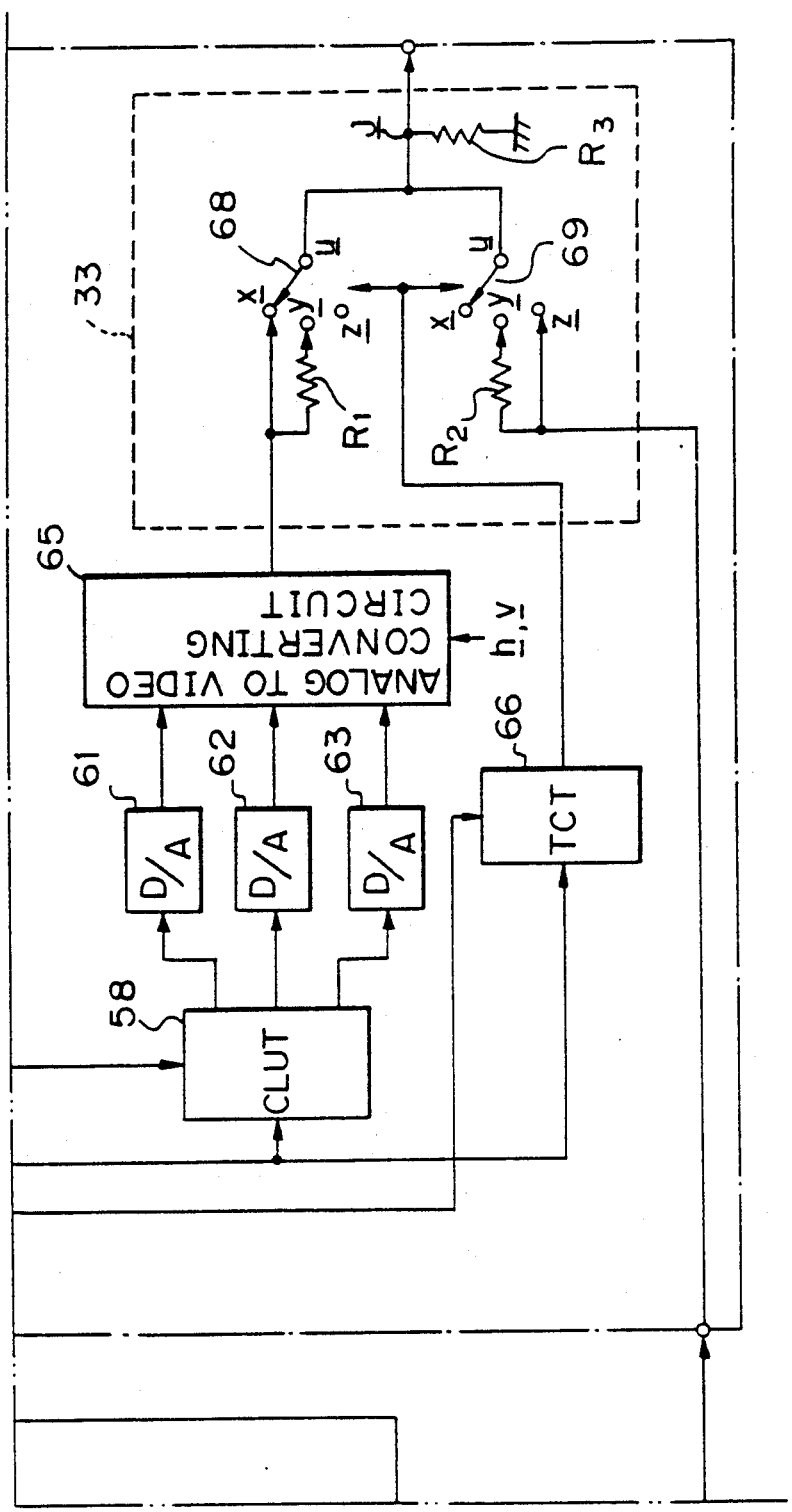

In FIGS. 6A through 6C, a disc 20 is rotated by a spindle motor 21, and information recorded on the disc 20 is read by an optical pickup 22.

Figure 7:
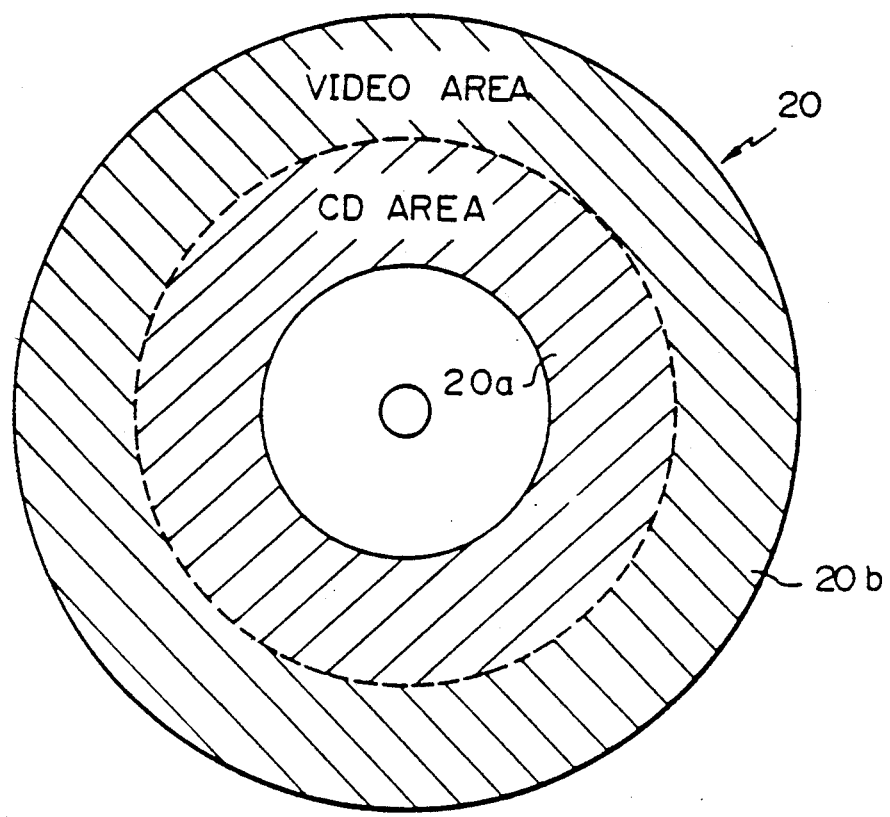
FIG. 7 is a diagram showing recording area of a composite disc.

The disc 20 is, for example, a composite disc shown in FIG. 7. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is seVeral hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

In order to make it possible to display a picture by the video format signal recorded in the video area by using an FM modulation and a picture obtained from the subcode, in a single picture screen at the same time, it is proposed separately by the applicants of the present application and others, to set a code to be inserted as the symbol 0 as shown in FIG. 8 in order to designate an additional mode, that is, "graphic mode with motion picture" in addition to the "zero mode" the "line-graphics mode", the "TV-graphics mode" and the "user's mode" which are also used in conventional recording and reproducing systems.

The structure of picture in the "graphics mode with motion picture" is identical with that in the "TV-graphics mode", and an instruction designated as "load transparency control table" having such a structure as shown in FIG. 9 is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by multiplexing together with the coded information signal including the subcode.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is alotted. FIG. 10 shows a relationship between bit patterns of the codes TCB-0 through TCB-15 and the modes designating the mixing ratio, and the mixing ratio in each mode.

The pickup 22 for readinq information of the disc 20 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is movable in the direction of disc radius by a direct drive of a transmission mechanism 25 which in turn has a slider motor 24 as a source of driving force, and made by a combination of rack and pinion gears A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulated the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format signal outputted by the video format signal demodulating and processing circuit 30 is supplied, as a video output signal of disc player 19, to a video switch 33 in the picture information reproducing and processing apparatus 34 according to the present invention. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is configured to generate analog audio signals by demodulating the PCM audio signal in the RF signal, separate the subcode of the PCM audio signal and output the subcode.

Among the subcode outputted by the coded information processing circuit 31, two bits of the channels P and Q are supplied to the system controller, and the bits of channels P through W are supplied to the picture information reproducing and processing apparatus 34 as the subcode output of the disc player 19.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected. The position detector 70 can have a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from an operation part 60 indicating whether the disc to be played is a compact disc or a composite disc, and mode designation information from the operation part 60, indicating whether the reproducing area is only the CD area or the video area, or both CD and video areas in the case of the playback of a composite disc. In this system controller 32, the processor executes processing of the signals inputted in accordance with programs previously stored in the ROM, and performs the control operation of each part of the video format signal demodulating and processing circuit 30, the coded information demodulating and processing circuit 31, a drive circuit (not shown) for driving the spindle motor 21, the driving circuit 71 for driving the slider motor, and the display part 72.

In the picture information reproducing and processing apparatus 34, the bits of the channels R through W outputted by the coded information signal demodulating an processing circuit 31 are supplied to a de-interleave and error correction circuit 52 and a Q-data separating circuit 90 through an input terminal $IN_1$. In the de-interleave and error correction circuit 52, the de-interleave of the six bits of the channels R through W only and the error correction using the parity Q and P are performed. On the other hand, the Q-data separating circuit 90 is configured to separate the Q-channel bit from the bits of the channels P through W. An output of the Q-data separating circuit 90 is supplied to a designated channel data generating circuit 91. The designated channel data generating circuit 91 is, like the system controller 32, made up of a microcomputer which includes a processor, a ROM, and a timer and so on. In this designated channel data generating circuit 91, the processor processes data outputted from an operation part 92 in accordance with key operations, in cooperation with a RAM 93, following a program stored in the ROM previously, and generates a designated channel data d.

Data having six bits of the channels R through W treated by de-interleave and error correction operations in the de-interleave and error correction circuit 52 is supplied to a mode/instruction decoder 53. The mode-/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack and to supply to each part signals respectively indicative of the modes and the instruction.

Output data of the de-interleave and error correction circuit 52 are supplied to a memory controller 54. The memory controller 54 is provided with the horizontal and vertical sync signals h and v separated by a sync separator circuit (not shown) from the video format signal outputted by the disc player 19. The memory controller 54 senses data indicating the color number of each pixel of each picture channels in the output data of the de-interleave and error correction circuit 52 by using the kind of the modes and the instruction indicated by the output of the mode/instruction decoder 53, and supplies those data to a multiplexer 55 together with control data according to the picture channel. The memory controller 54 supplies write address data according to pixels corresponding to the data supplied to the multiplexer 55 and write command pulses to one of 16 video memories 56a through 56 which corresponds to the picture channel of the data supplied to the multiplexer. Also, the memory controller 54 supplies read address data which sequentially varies with the horizontal and vertical sync signals h and v and read command pulses to the video memories 56a through 56p. The multiplexer 55 is configured to selectively supply data indicating the color number of each pixel outputted by the memory controller 54 to one of video memories 56a through 56p corresponding to the control data.

The video memories 56a through 56p are respectively made up of a RAM having addresses corresponding to all pixels on a picture having 50 "fonts" by 18 "fonts" in the row and column directions, and four bits of data can be stored in each address.

Data outputted from the video memories 56a through 56p are supplied to a selector 57. The selector 57 is configured to selectively output one of data read out from each of the video memories 56a through 56p by the designated channel data d outputted from the designated channel data generating circuit 91. Output data of the selector 57 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data outputted from the selector 57.

The output data of this CLUT 58 is made up of three data respectively representing the level of one of the R, G, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 66. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and sent subsequently.

In addition, the output data of the de-interleave and the error correction circuit 52 are also supplied to a transparency control table 66 (this table being referred to hereinafter as the TCT). The TCT 66 is based on the picture information recording and reproducing system using the subcode which is separately proposed by the applicants of the present application and others, and the TCT 66 is configured to detect a "load TCT" instruction in the output data of the de-interleave and error correction circuit 52 in accordance with the kind of the modes and instruction indicated by the output signal of the mode/instruction decoder 53 hold transparency control bits TCB-0 through TCB-15, and output by selecting one of the TCB-0 through TCB-15 being held, corresponding to a color number indicated by the data outputted from the selector 57.

The output signal of the TCT 66 is supplied to a video switch 33 as a control signal. In addition to the output signal of the TCT 66, the video format signal obtained from the subcode and outputted by the analog-to-video converting circuit 65, and the video format signal outputted by the video format signal demodulating and processing circuit 30 are supplied to the video switch 33.

In the video switch 33, the video format signal obtained from the subcode is supplied to a stationary contact x of a changeover switch 68, and also supplied to its stationary contact y through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal outputted from the video format signal demodulating and processing circuit 30, which is supplied through an input terminal $IN_2$. is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact with one of its stationary contacts x, y, z in accordance with the control signal. The movable contacts u, u of the changeover switches 68 and 69 are mutually connected A resistor $R_3$ is connected between a common junction J of the movable contacts u, u and ground. A mixed signal of the video signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. On the other hand, the resistance values of the resistors $R_1$ and $R_2$ are determined so that the mixing ratio is equal to a value M (M is between 20% and 80%) when the movable contacts z, z are in contact with the stationary contacts y, y. The signal derived at the common junction J is supplied to a video output terminal.

Figure 11:
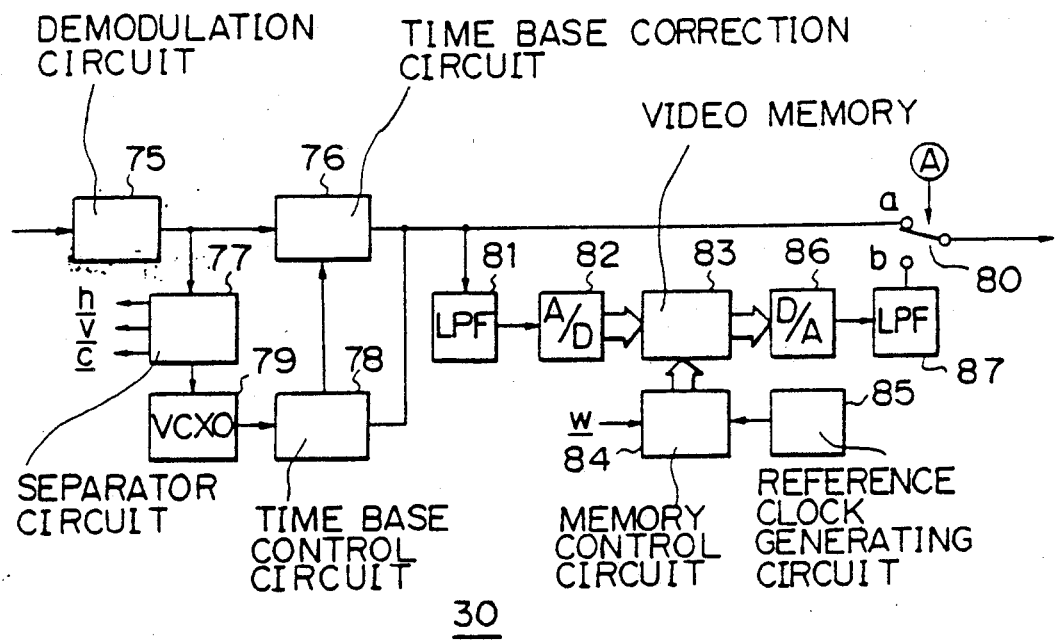
FIG. 11 is a block diagram showing a specific configuration of the video format signal demodulating and processing circuit 30 in the apparatus shown in FIGS. 6A through 6C.

FIG. 11 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. In addition, the separator circuit 77 is configured for example to include an oscillator, and to generate and output horizontal and vertical sync signals h and v having predetermined frequencies by using that oscillator when the video format signal is not supplied.

The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example Japanese Pat. application laid-open number The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 isconfigured to perform control operations for sequentially read-out data written in each address of the video memory 83 in accordance with a clock from a reference clock generating circuit 85, and for rewriting the contents of each address of the video memory 83 in response to a write enable signal w which is outputted from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correlation circuit 76, and switched to a position b in response to a changeover command from the system controller 32, to selectively output the video format signal having passed through the video memory 83.

Figure 12:
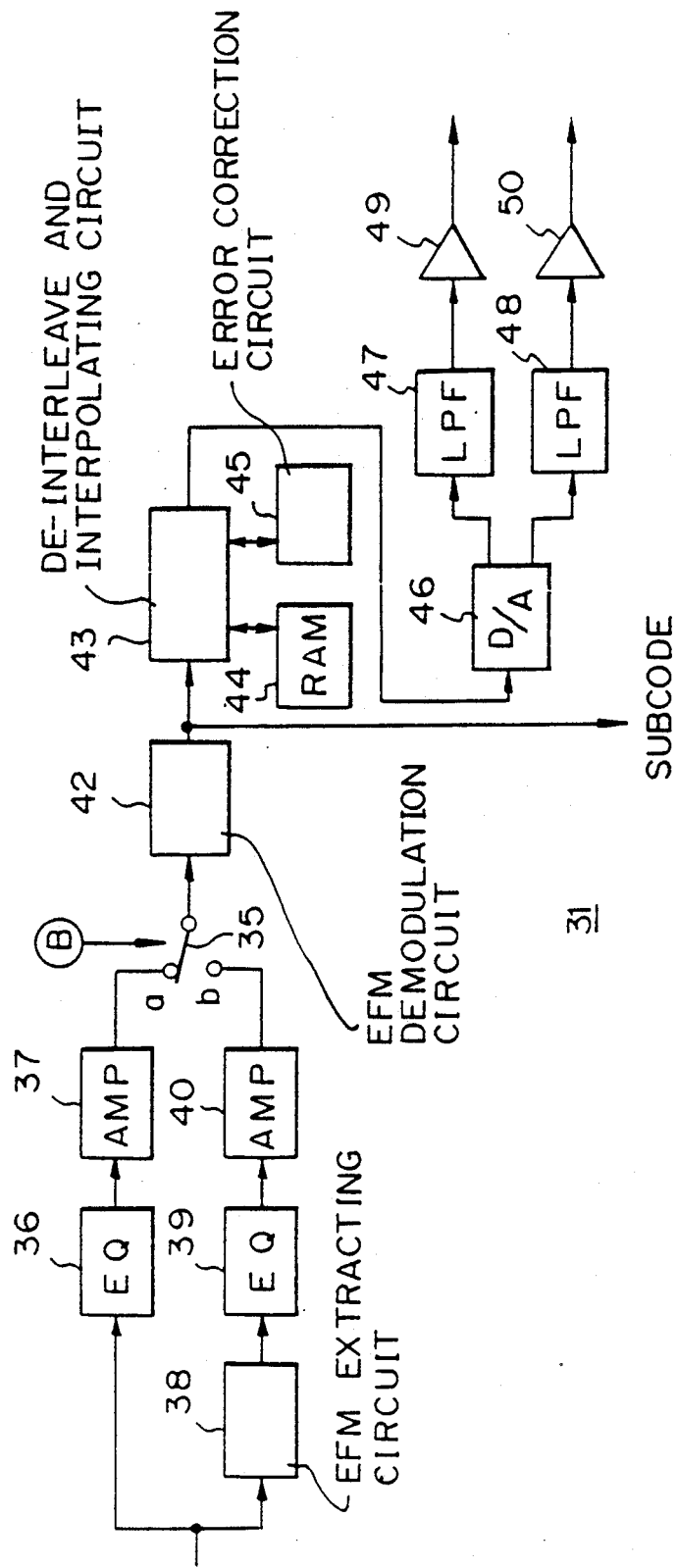
FIG. 12 is a block diagram showing a specific configuration of the coded information signal reproducing and processing circuit 31 in the apparatus shown in FIGS. 6A through 6C.

FIG. 12 is a block diagram showing a specific circuit construction of the coded information signal demodulating and processing circuit 31. The circuit is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different for the case of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as :he EFM signal obtained during CD area playback.

During playback of a CD disc, the selector switch 35 is held in position a.

The playback EFM signal selected by the selector switch 35 is supplied to the EFM demodulation circuit 42 which performs the demodulation process, to obtain a PCM data that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

Figure 13:
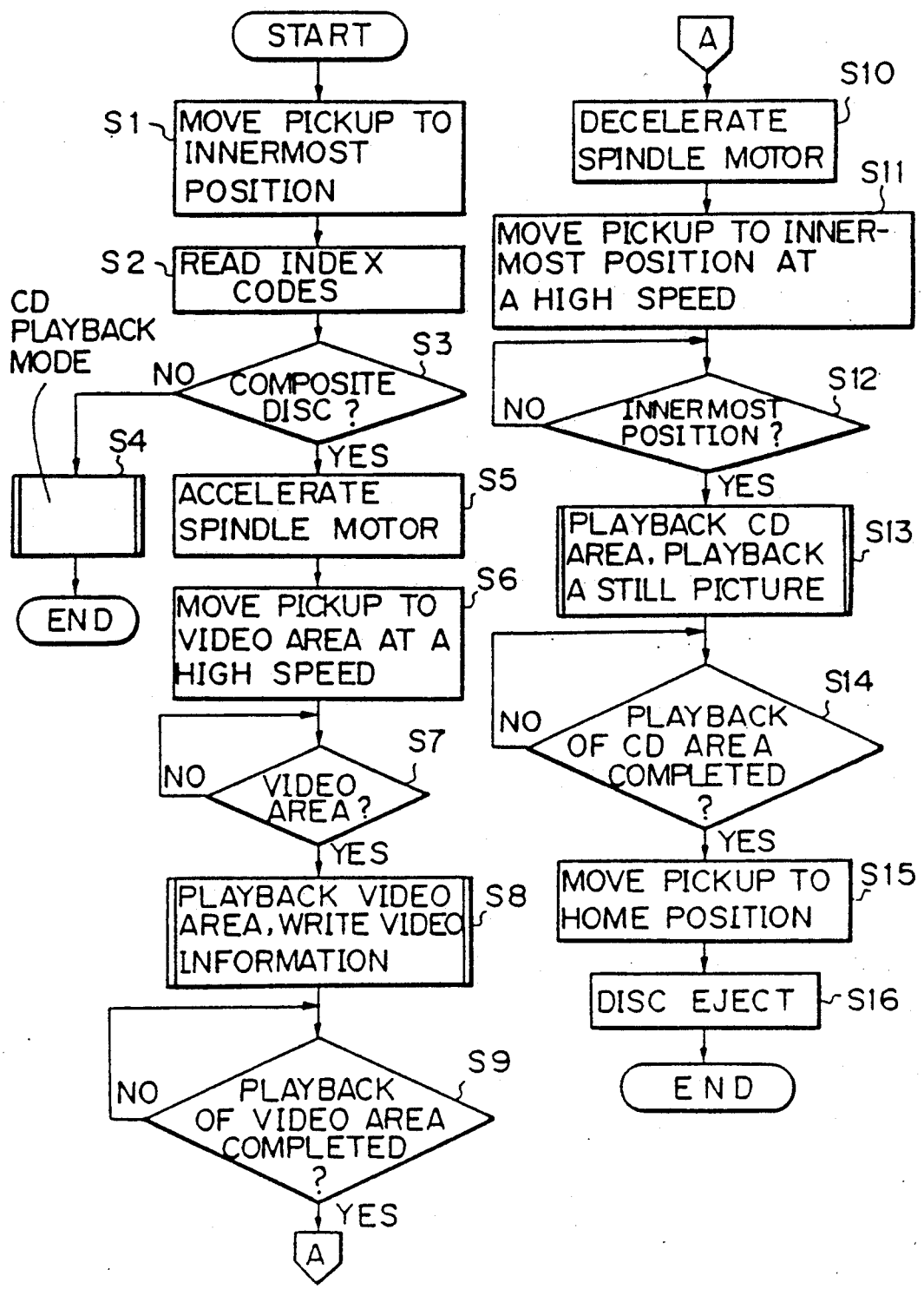
FIG. 13 is a flowchart showing the operation of processor in a system controller 32 the apparatus shown in FIGS. 6A through 6C.

Operations of the processor in the system controller 32 in the above configuration will be specifically explained with reference to the flow chart of FIG. 13.

Assume that a composite disc is set in a playback position. When a start command is issued from the control part 60 in this state, the processor transmits a drive command to the motor driving circuit 71, so that the slider motor 24 is driven to move the pickup 22 to an innermost peripheral position (step S1) If it is detected that the pickup 22 has reached the innermost peripheral position by means of a detector switch of any usual configuration (not shown), the processor executes a focusing operation of the pickup 22 and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in the step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6).

After these operations, when it is detected that the pickup 22 has reached to the video area by the detection signal from the position detector 70 step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or designated by an address designation through the key operation of the operation part 60.

If it is detected that the playback of the video area has been completed, in step S9, then the processor decelerates the spindle motor 21 to &he maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector sWitch 80 in the video format signal demodulating and processing circuit 30 is changed over by the processor to the position b thereby selecting and outputting the video information which was written in the video memory 83 during video area playback. Thus, playback of a still picture is performed during CD area playback.

When the completion of the CD area playback is detected by reading the information of audio lead-out (step S14), the processor initiate the driving of the slider motor 24 to move the pickup 22 to its home position (step 15) unless any operational command is present. Furthermore, a loading mechanism (not shown in the drawings) performs disc ejection (step 16), to complete the playback operating sequence.

The operation of the processor in the designated channel data generating circuit 91 will be described with reference to FIG. 14.

During the execution of the main routine, the processor proceeds to a step S20 in response to an interruption by a timer for example, in which whether or not TOC (Table of Contents) data is outputted from the Q-data separating circuit 90. If the TOC data is not outputted, the processor then judges whether or not a normal mode is designated by a key operation in the operation part 92 (step S21). If the normal mode is not designated, the processor judges whether or not a direct-program FCS mode is designated (step S22) If the direct-program FCS mode is not designated, the processor judges whether or not a static-program FCS mode is designated (step S23). If the static-program FSC mode is not designated, the processor judges whether or not the FSC play mode is designated (step S 24).

If it is judged, in step S20, that the TOC data is outputted, the processor writes the TOC data in a data area of the RAM 93 (step S25), and restarts the execution of the routine which was being performed immediately before the processor proceeded to the step S20.

If it is judged, in step S21, that the normal mode is designated, the processor judges whether or not the designation of picture channel is performed by a key operation in the operation part 92 (step S26) If it is judged, in step S 26, that the designation of picture channel is performed, the processor transmits the designated channel data d corresponding to the picture channel to the selector 57 (step S27), and restarts the execution of the routine which was being performed immediately before the processor proceeded to the step S20.

If, on the other hand, it is judged, in step S22 that the direct-program FCS mode is designated, the processor judges whether or not the designation of picture channel is performed by a key operation in the operation part 92 (step S28). If, in step S28, it is judged that the designation of picture channel is performed, the processor transmits the designated channel data d corresponding to the designated picture channel to the selector 57 (step S29), and writes a code indicating the designated picture channel and a code indicating the number of music selection in the data outputted from the Q-data separating circuit 90, in the program area of the RAM 93 as a picture channel designating instruction code (step S30). Subsequently, the processor judges whether or not an end code is issued by a key operation in the operation part 92 (step S31). If it is judged, in step S31, that the end code is issued the processor reads-out a disc code for specifying the disc in the TOC data which is stored in the data area of the RAM 93 by the operation in step S25, and in turn writes it in the program area of the RAM 93 (step S32), and restart the operation which was being executed immediately before the processor proceeded to the step S20. It it is judged, in step S31 that the end code is not issued, the processor immediately restarts the execution of the routine which was being performed immediately before the processor proceeded to the step S20. If, on the other hand, it is judged, in step S28, that the designation of picture channel is not performed, the processor proceeds to the step S31.

If, in step S23, that the static-program FCS mode is designated, the processor judges whether or not the picture channel designation instruction code, which is made up of the code indicating the picture channel and the code indicating the number of music selection, is outputted by a key operation in the operation part 92 (step 35). If it is judged in step S35, that the picture channel designation instruction code is outputted, the processor writes the outputted picture channel designation instruction code in the program area of the RAM 93 (step, S36), and proceeds to step S31. If, on the other hand, it is judged, in step 35, that the picture channel designation instruction code is not outputted, the processor immediately proceeds to step S31.

On the other hand, if it is judged, in step S24, that the FCS play mode is designated, the processor judges whether or not the disc code written in the data area of the RAM 93 by the operation of the step S25 and the disc code written in the program area are identical with each other (step S40). If, in step S40, it is judged that the disc codes are identical with each other, the processor takes-in the code indicating the number of music selection in the output data of the Q-data separating circuit 90 (step S41), and detects a picture channel designated by the code taken by the above operation and a music-selection-number code constituting the picture channel designation instruction code, and transmits the designated channel data d corresponding to the detected picture channel (step S42) and restarts the execution of the routine which was being executed immediately before the processor proceeded to step S20. If it is judged, in step S40, that the disc codes are not identical with each other, the processor immediately restarts the execution of the routine which was being executed immediately before the processor proceeded to step S20.

In the operating sequence described above, playback of the information recorded in the CD area of the composite disc is performed in steps S10 through S14 after the playback of information recorded in the video area in steps S1 through S9. When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., each of picture data of 16 channels are in turn stored in the video memories 56a through 56p by the memory controller 54 and the multiplexer 55. Data read-out from one of the video memories 56a through 56p according to the designated channel data d is selectively outputted from the selector 57. When the picture data outputted from the selector 57 is supplied to the CLUT 58, color data of a color number indicated by the picture data is then outputted from the CLUT 58. A video format signal based on this color data is outputted from the analog video converting circuit 65, and supplied to the video switch 33.

Figure 15:
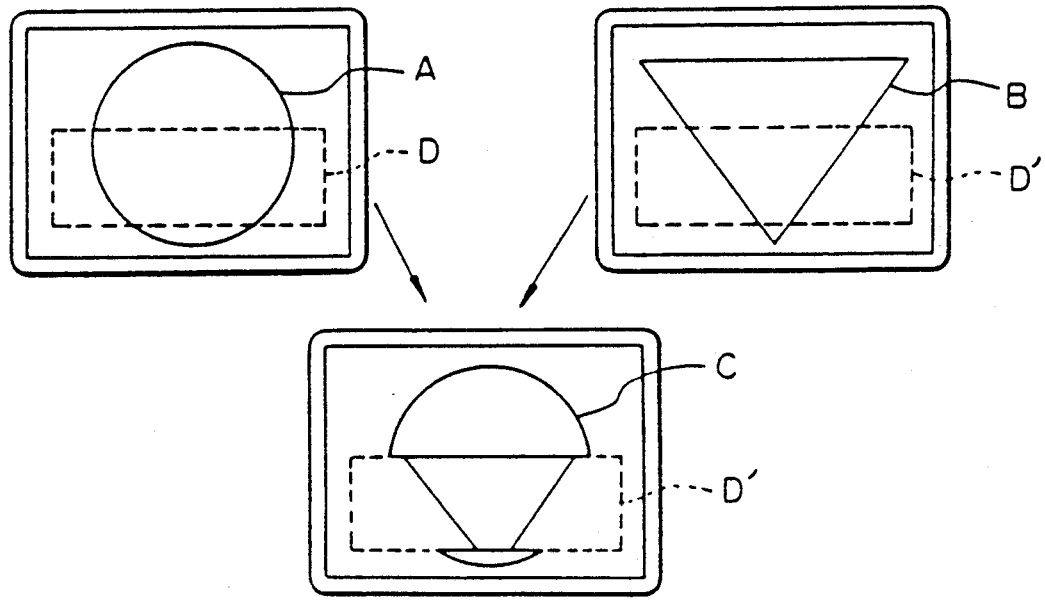
FIGS. 15, and 16A through 16C, are diagrams showing pictures obtained by the apparatus shown in FIG. 6A through 6C.

If the "load TCT" instruction based on the recording and reproducing system, which is separately proposed by the applicants of the present application and others, is decoded in this state, the transparency control bits TCB-0 through TCB-15 respectively corresponding to each color number are then held in the TCT 66. Among the TCB-0 through TCB-15 being held, one corresponding to the color number indicated by the data outputted from the selector 57 is selectively outputted from the TCT 66, and the mixing ratio in the video switch 33 is designated by the output of the TCT 66. Thus, the mixing ratio between the video format signal outputted from the analog-to-video converting circuit and the video format signal outputted from the video format signal demodulating and processing circuit 30 is controlled for each pixel. Consequently, a combination of pictures such as illustrated in FIG. 15 is made possible. Specifically, the mixing ratio is set to 100% for a portion corresponding to each pixel outside a region D of a picture A based on the video format signal outputted from the video format signal demodulating and processing circuit 30, and is set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and and the portion of the picture B within the region D'.

Figure 16A:
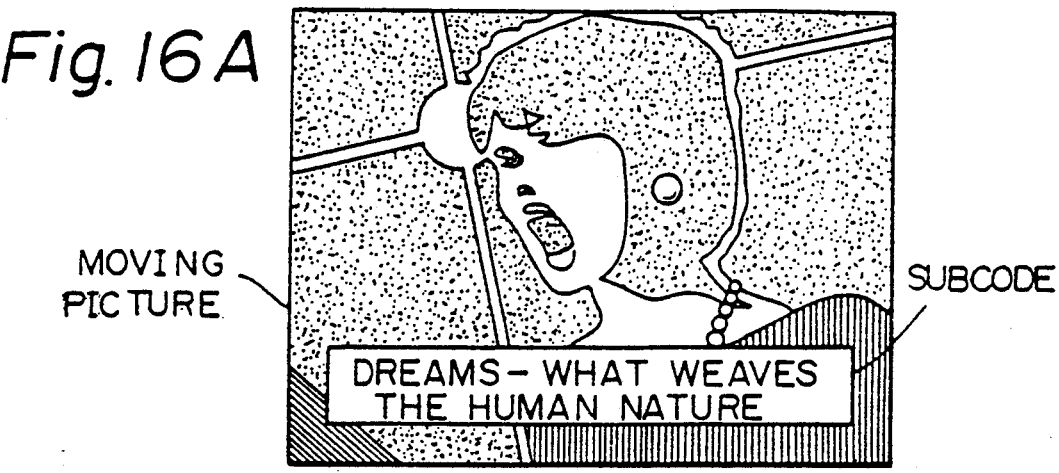
Figure 16B:
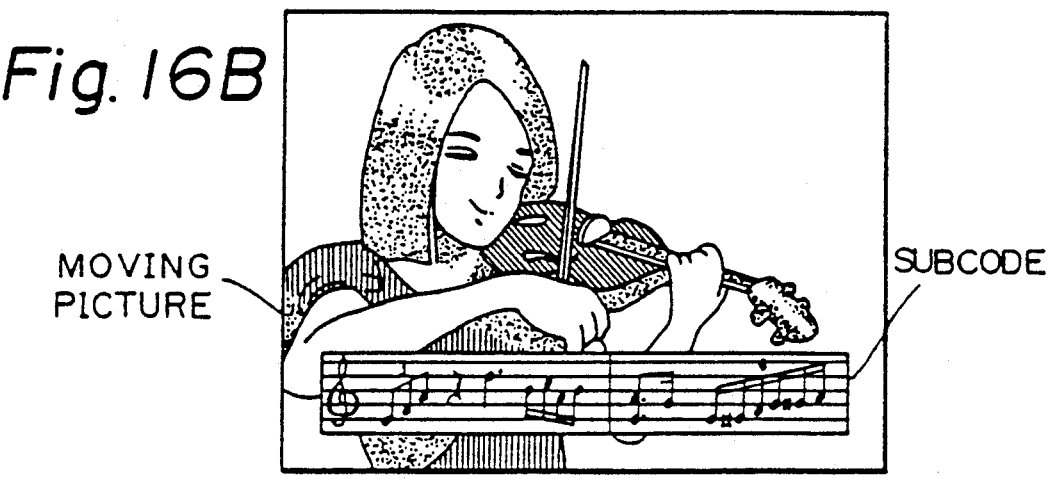
Figure 16C:
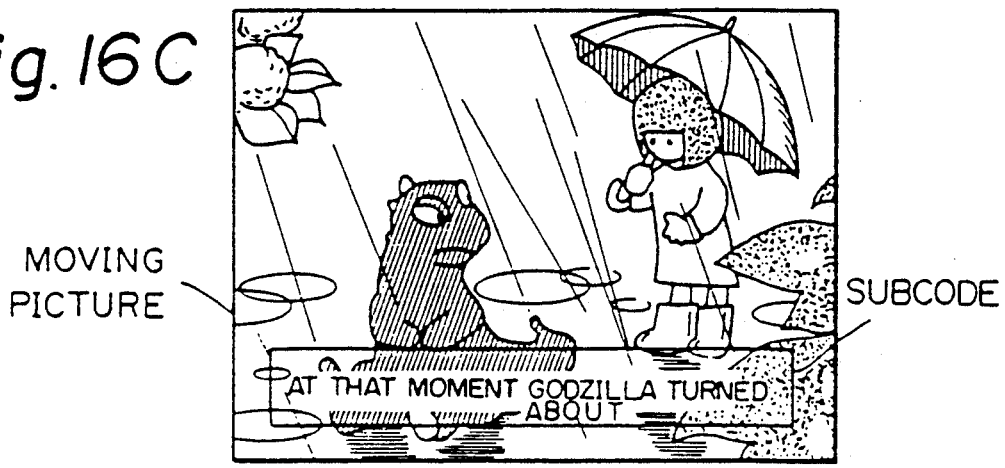

In this way, it is possible to compose a picture as illustrated in FIGS. 16A through 16C, in Which a caption a musical score, or an explanation of a scene, etc. obtained from the subcode is inserted into a moving picture obtained by the video format signal recorded in the video area or a still picture obtained by the video memory 83.

Figure 17:
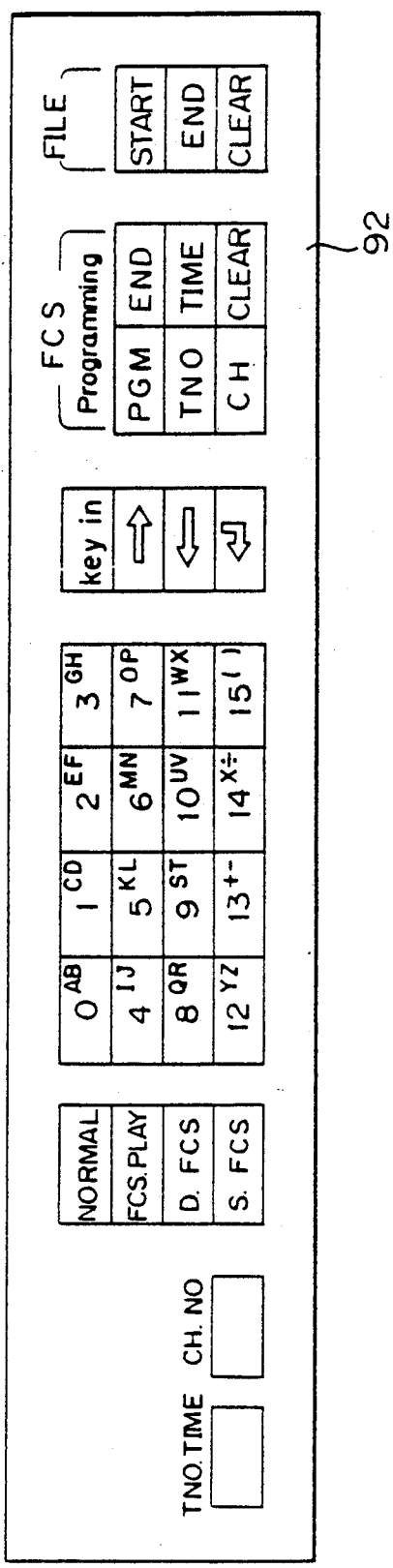
FIG. 17 is a diagram showing arrangement of keys of an operation part 92 in the apparatus shown in FIGS. 6A through 6C.

FIG. 17 shows the arrangement of operation keys of the operation part 92. With the operation keys illustrated in this figure, the designation of picture channel can be performed by operating the "CH" key and one of "0" through "15" keys after operating "NORMAL" key. When the picture channel is designated in this way, the designated channel data d corresponding to the designated picture channel is supplied to the selector 57 through the operations of steps S21, S26, and S27. Thus, the designation of picture channel by manual operation can be performed.

On the other hand, after the designation of the direct-program FSC mode by the operation of "D.FSC" key, when the data indicating the designated picture channel is outputted by the operation of "CH" key and any of the "0" through "15" keys and "PGM" key, the channel data corresponding to the designated channel is supplied to the selector 57 through the operations of the steps S22, S28, S29, and S30, and the data indicating the designated picture channel and the Q-data under this condition are written in the program area of the RAM 93 as the channel designation instruction code. Subsequently, when the end code is outputted by the operation of "END" key, the disc code is written i the program area through the operations of steps S31, and S32, to complete the programming operation.

In addition, after the static-program FCS mode is designated by the operation of "S.FCS" key, when the music selection number code is outputted by the operation of "TN" key and one of the "0" through "9" keys, and the picture channel designation instruction code is formed by the output of the code indicating the picture channel by the operation of "CH" key, any one of "0" through "15" keys and "PGM" key, the picture channel designation instruction code is written in the program area through the operations of the steps S35 and S36. After this operation, when the end code is outputted by the operation of the "END" key, the disc code is written through the operations of the steps S31, and S32 to complete the programming operation.

Furthermore, when the FCS play mode is designated by the operation of "FCS.PLAY" key, judgement is performed as to whether or not a disc for which the programming is already performed by the direct-program FCS mode or the static-program FCS mode through the step S24 or the step S40, is loaded. With this judging operation, the switching control of the picture channel in accordance with the program stored in the RAM 93 is performed through steps S41 and S42 only when a disc for which the programming is already performed is loaded.

It will be appreciated from the foregoing explanation, the picture information reproducing and processing apparatus according to the present invention is provided with a program memory, a separating means for separating a recording medium code for specifying the recording medium from the subcode, and an instruction generating means for generating an instruction for designating a channel to be selected out of N-channels by a manual operation during the playing of recording medium, and the apparatus is configured to write the instruction and the recording medium code outputted from the separating means when the above described instruction is generated, to generate, in response to a program play command, a designated channel data indicating the channel designated by the Instruction written in the program memory when the recording medium code written in the program memory and the recording medium code outputted from the separating means are identical with each other, and to generate a picture signal corresponding to a graphic code occupying a channel out of N-channels, designated by the designated channel data. Therefore, when a recording medium which has been played at least one time is to be played, the selection of picture channel is performed automatically, thereby making the apparatus quite easy to operate.

What is claimed is:

1. An apparatus for reproducing and processing picture information obtained from a recording medium to form a picture signal, wherein a recording medium code and a plurality of graphic codes including the picture information are inserted as a subcode of a coded information signal stored on the recording medium, wherein said picture information occupies N channels where N is a natural number greater than 1, and wherein said recording medium code specifies the recording medium, said apparatus comprising:

read means for reading the coded information signal from the recording medium;
    input means for inputting the subcode from the coded information signal;
    separating means for separating means for separating the recording medium code from the subcode;
    instruction generating means for generating an instruction for selecting one of said N channels by a manual operation during playing of the recording medium;

designating channel data generating means for writing to a program memory the instruction and the recording medium code when the instruction is generated;

output means for outputting in response to a program-play command designated channel data indicating a channel designated by the instructions stored in the program memory when the recording medium code stored in program memory and the recording medium code output from the separating means are identical; and picture signal generating means for generating the picture signal from one of said plurality of graphic codes occupying the one of said N channels designated by said designated channel data.

2. An apparatus for reproducing and processing picture information obtained from a recording medium to form a picture signal, wherein a recording medium code and a plurality of graphic codes including the picture information are inserted as a subcode of a coded information signal stored on the recording medium, wherein said picture information occupies N channels where N is a natural number greater than 1, and wherein said recording medium code specifies the recording medium, said apparatus comprising:

read means for reading the coded information signal from the recording medium;

input means for inputting the subcode from the coded information signal;

separating means for separating means for separating the recording medium code from the subcode;

instruction generating means for generating an instruction for selecting one of said N channels by a manual operation during playing of the recording medium;

designated channel data generating means for writing to a program memory the instruction and the recording medium code when the instruction is generated;

output means for outputting in response to a program-play command designated channel data indicating a channel designated by the instructions stored in the program memory; and picture signal generating means for generating the picture signal from one of said plurality of graphic codes occupying the one of said N channels designated by said designated channel data.

3. An apparatus for reproducing and processing picture information obtained from a recording medium to form a picture signal, wherein a recording medium code and a plurality of graphic codes including the picture information are inserted as a subcode of a coded information signal stored on the recording medium together with a video format signal, wherein said picture information occupies N channels where N is a natural number greater than 1, and wherein said recording medium code specifies the recording medium, said apparatus comprising:

read means for reading the coded information signal and the video format signal from the recording medium;

first input means for inputting the subcode from the coded information signal;

second input means for inputting the video format signal; p1 separating means for separating means for separating the recording medium code from the subcode;

instruction generating means for generating an instruction for selecting one of said N channels by a manual operation during playing of the recording medium;

designated channel data generating means for writing to a program memory the instruction and the recording medium code when the instruction is generated;

output means for outputting in response to a program-play command designated channel data indicating a channel designated by the instructions stored in the program memory the recording medium code stored in program memory and the recording medium code output from the separating means are identical;

picture signal generating means for generating the picture signal from one of said plurality of graphic codes occupying the one of said N channels designated by said designated channel data; and mixing means for mixing the picture signal with the video format signal.

* * * * *